March 8, 1960    A. D. WHITE    2,928,000
GAS TUBE MICROWAVE DETECTOR
Filed Nov. 21, 1955
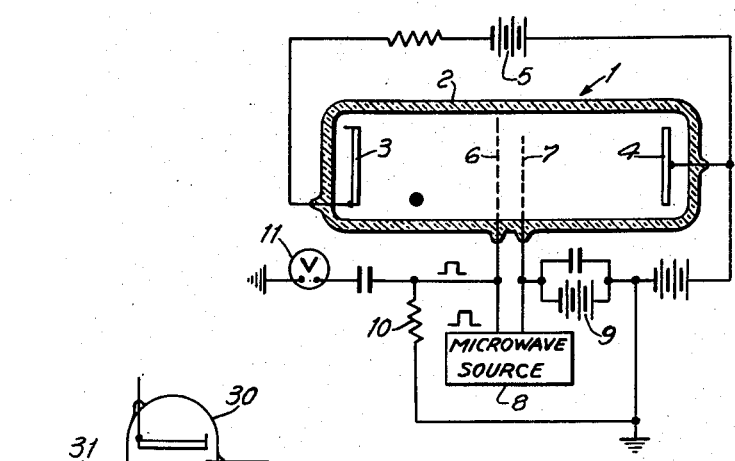
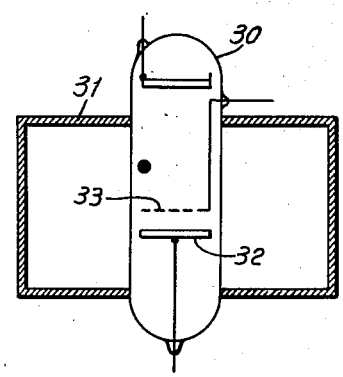
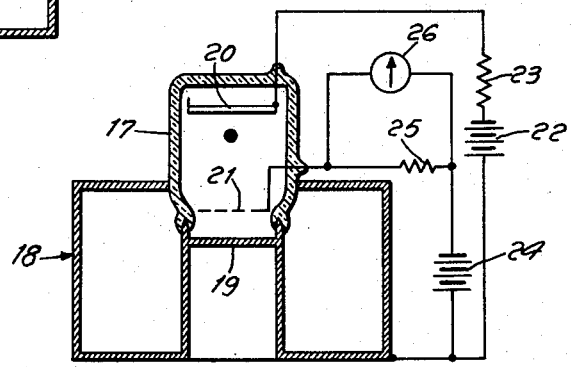
INVENTOR
ALAN D. WHITE
BY Henry Kolin
AGENT

United States Patent Office 2,928,000
Patented Mar. 8, 1960

2,928,000

GAS TUBE MICROWAVE DETECTOR

Alan D. White, Plainfield, N.J., assignor to International Telephone and Telegraph Corporation, Nutley, N.J., a corporation of Maryland Application November 21, 1955, Serial No. 547,912

8 Claims. (Cl. 250—27)

This invention relates to methods and means for detecting and measuring microwave energy, and more specifically to the utilization for this purpose of the rectification action of a probe immersed in a gas discharge plasma.

Microwave energy is ordinarily measured either by thermal or by electrical methods. In the thermal method, the high-frequency power propagated is converted to heat, which is then measured by a temperature-responsive technique. For high-level power, that is, in excess of one watt, measurement of the thermal energy is usually made by a calorimetric method, using either water or a gas such as ammonia as the calorimetric fluid. For low- and medium-level power measurements, various types of bolometers, principally those such as the barreter and the thermistor, have been used. These latter are temperature-responsive relatively sensitive power detectors which are capable of measuring a few microwatts of power when used in properly designed bridge circuits. The calorimetric and bolometric methods are severely limited in actual practice because of their temperature sensitivity. Thus, they must be used under essentially isothermal conditions, or precise temperature compensation must be provided. In addition to the temperature sensitivity of these devices, they are relatively slow acting and their over-all sensitivity further depends upon the precision and sensitivity of the complex measuring circuits, such as bridge circuits, in which they are used.

The electrical methods for the detection of microwave energy involve rectification of this microwave energy, i.e., conversion to a low frequency, by means of a non-linear element and the detection of this energy by ordinary low-frequency techniques. Useful non-linear electrical devices for accomplishing this demodulation are the germanium and silicon crystal detectors. These may be of the point-contact or junction type, and, in general, have good non-linearity response at microwave frequencies. However, such crystal detector devices as now known are not operable at substantially elevated ambient temperatures. Furthermore, their power-handling capacities with respect to withstanding high-peak powers are severely limited. Also, these devices are frequently erratic and unreliable in use.

Attempts have also been made to use close-spaced vacuum diodes for microwave detection. Because of the large transit time of the electrons between the elements of the tubes, the conversion or rectification efficiency is relatively low. Attempts to improve this rectification efficiency by a closer spacing of the electrode elements have proven unsatisfactory. The precise tolerances required for this close spacing make such tubes extremely difficult to construct with any degree of reliability. A considerable need therefore exists for a simple, reliable device for detecting and measuring microwave energy. I have discovered that such a device may be obtained by providing rectification action within a gas discharge plasma, and utilizing this action for microwave detection.

It is an object of the present invention to provide a simple detector for microwave energy that is free from the limitations of known devices as hereinbefore described.

It is a further object to provide such a detector which is particularly useful at higher ambient temperatures than can be used with known electrical detectors.

It is still a further object to provide a detector for microwave power that is capable of handling low-, medium-, and high-level power.

It is a feature of this invention either to couple an electrode immersed in an ionized gaseous medium, i.e., a plasma such as is created in a gas discharge, to a source of microwave energy or to dispose a device containing the gas plasma directly in the path of propagated microwave energy. The electrode so immersed or another electrode of the gas-containing device disposed in the path of propagated microwave energy is maintained at a potential in relation to that of the plasma so as to utilize the rectification action of the gas plasma for microwave detection.

The above-mentioned and other features and objects of this invention and the manner of attaining them will become more apparent by reference to the following description taken in conjunction with the accompanying drawings, wherein:

Fig. 1 is a cross-sectional view of an embodiment of a gas discharge tube of this invention using a plurality of probes; and Figs. 2 and 3 are schematic views, partly in section, of two embodiments of a gas discharge tube directly associated with a waveguide structure.

Referring to Fig. 1, a gas discharge tube 1 is shown containing a gaseous medium within a dielectric envelope 2. A gas discharge is maintained within the tube 1 by means of the cathode 3, anode 4 and an appropriate source of potential 5 adjusted so as to produce an ionized gaseous discharge within the tube. Immersed in the ionized gaseous medium, which is ordinarily referred to as a gas discharge plasma and has a high concentration of positive ions and electrons therein in substantially equal quantity, is a pair of spaced-apart electrodes 6 and 7. These electrodes may be in the form of grid-like or foraminous structures. As mentioned previously, the operation of the gas tube detector depends upon the utilization of the non-linear current-voltage characteristics of one or more probes immersed in a gas discharge plasma. The microwave source 8, either in the form of a microwave generator, a cavity resonator or a form of waveguide, is coupled by way of electrode probes 6 and 7 to the plasma contained in tube 1. The potential of one of these probes is raised slightly above the potential of the other by means of a bias voltage source 9. Both electrodes are maintained at a potential greater than plasma potential by means of this source of potential 9. Under these conditions the body of the plasma is actually in contact with the probe or separated from it by an extremely thin space-charge sheath. For small or zero spacing between the plasma and the probe at probe potentials in the region of the plasma potential, the dynamic characteristics of the probe are similar to the static characteristics. Thereby, one can arrive at the rectification action by utilizing the static characteristics. The rectification current for an applied alternating voltage from soure 8 is determined largely by the magnitude of the second derivative of the static characteristic curve of probe current versus probe potential relative to plasma potential at the point corresponding to the potential of the probe. Thus, by adjusting the potential of the electrodes with respect to each other and with respect to the plasma, one can set the operating point for rectification of microwave energy. The net rectified current flow appears as a voltage drop across a load resistor 10 and can be measured by a suitable indicating device 11, such as a voltmeter.

Another embodiment of the gas discharge tube of this invention used directly in conjunction with a waveguide or cavity is illustrated in Fig. 2. A gas discharge tube 17 is disposed in an opening of a ridged waveguide 18 and contains an anode 19, cathode 20 and grid 21. A stable gaseous discharge is maintained between anode 19 and cathode 20 by means of an external voltage source 22 and current limiting resistor 23. The grid 21 and the anode 19 are disposed in the waveguide or cavity in such a way that a high radio-frequency voltage appears across the grid 21 and anode 19. The anode is selected rather than the cathode since the latter is noisy. The grid is biased with respect to the anode by an external potential source 24. Alternatively, it can be biased through series resistor 25 which may also function as a load resistor. The differential rectification current flowing in the anode-grid circuit can be monitored at 26. In this embodiment the anode 19 comprises a part of the waveguide wall structure which in the illustration of Fig. 2 constitutes part of the ridge structure of this waveguide. Because of the low impedance which can be realized between the grid 21 and the anode 19, this device can be made to have good video bandwidth.

In Fig. 3, a gas tube 30 is inserted in a waveguide 31 with the anode 32 and the grid 33 disposed in close-spaced relation in the waveguide for rectification of a part of the microwave energy propagated along this waveguide. In this embodiment the waveguide is of the hollow rectangular form and the tube 30 extends through openings in the top and bottom walls thereof.

As mentioned, detection occurs, upon propagation of microwave energy through the gas discharge tube herein described, when the rectification current to one electrode or probe in the plasma differs from the rectification current to another probe. In Fig. 1 this difference has been brought about by maintaining probes 6 and 7 at slightly different potentials relative to the adjacent plasma. This difference may also be brought about by using probes of different collecting area as indicated by the different sizes of probes 6 and 7. With the device described, signals of low power, i.e., below 10 milliwatts; medium power, from 10 milliwatts to 1 watt; and high power, about 1 watt; may be detected using essentially the same device. The device is not temperature sensitive and thus may be used in uncompensated temperature circuits and also at ambient temperatures far in excess of those at which crystal detectors of the germanium and silicon type cease to be operative. The only limitations to the power peaks handled by the device are those imposed by the power-handling capabilities of the grid. This power handling may, of course, be increased where desired. Non-electronegative gases, such as the rare gases or mixtures thereof including hydrogen, may be used in the practice of this invention. While the device described is capable of acting as a microwave detector at a frequency range from 100 to 20,000 megacycles, a preferred range is between 1,000 and 12,000 megacycles.

While I have described above the principles of my invention in connection with specific apparatus and methods, it is to be clearly understood that this description is made only by way of example and not as a limitation to the scope of my invention as set forth in the objects thereof and in the accompanying claims.

I claim:

1. A device for detecting electromagnetic wave energy comprising means retaining a body of ionizable gaseous medium, a pair of electrodes associated with said medium, means to apply a potential across said electrodes to ionize said medium to produce a stable gaseous discharge between said pair of electrodes, at least one other electrode, a circuit coupled to said other electrode and having means to bias said other electrode to a potential greater than the potential of said medium when ionized, means to apply electromagnetic wave energy across a portion of said ionized medium adjacent said other electrode to effect a rectification of at least a portion of said wave energy through said ionized medium to produce a flow of direct current in said circuit, and means to detect said direct current.

2. A device for detecting electromagnetic wave energy comprising means retaining a body of ionizable gaseous medium, cathode and anode electrodes associated with said medium, means to apply a potential across said electrodes to ionize said medium to produce a stable gaseous discharge between said cathode and anode electrodes, a third electrode immersed in said medium, means to bias said third electrode to a potential higher than the potential of said medium when ionized, circuit means to apply electromagnetic energy between said third electrode and one of the other of said electrodes to effect rectification of at least a part of said wave energy and thereby produce a flow of direct current in at least a part of said circuit means, and means coupled to said circuit means to detect the presence of said direct current.

3. A device according to claim 2, wherein said third electrode is a grid structure disposed in close-spaced relation to said anode electrode.

4. A device according to claim 3, wherein said circuit means includes a waveguide structure for propagation of said wave energy and one of said anode electrodes comprises one wall of said waveguide and said grid structure is disposed in an opening contained in another wall of said waveguide.

5. A device for detecting electromagnetic wave energy comprising a waveguide for propagating said wave energy, said waveguide having disposed therein an envelope containing a body of ionizable medium, cathode, anode and grid electrodes immersed in said medium, means coupling said anode to a wall of said waveguide, said grid electrode being disposed in close-spaced relation to said anode, means to apply a potential across said cathode and anode electrodes to ionize said medium to produce a stable gaseous discharge between said cathode and anode electrodes, and means to apply a bias voltage across said grid and anode electrodes which is greater than the potential of said medium when ionized, the wave energy in said waveguide producing a radio-frequency voltage between said grid and anode electrodes to effect rectification of a part of said energy in the grid-anode circuit.

6. A device according to claim 5, wherein said anode electrode includes a wall portion of said waveguide and said grid electrode is disposed closely adjacent said wall portion.

7. A device for detecting electromagnetic wave energy comprising a hollow rectangular waveguide having an opening through two opposed walls thereof, a gas discharge tube disposed in said opening having cathode, anode and grid electrodes, at least said anode and grid electrodes being disposed within the confines of said waveguide, means to apply a potential across said cathode and anode electrodes to ionize the gaseous medium contained in said tube to produce a stable gaseous discharge between said cathode and anode electrodes, and circuit means to apply a bias potential across said grid and anode electrodes greater than the potential of ionized gaseous medium adjacent thereto to effect rectification of said wave energy and thereby produce a flow of direct current in the grid-anode circuit, and means to detect said direct current.

8. A device for detecting electromagnetic wave energy comprising means retaining a body of ionizable gaseous medium, a pair of electrodes associated with said medium, means to apply a potential across said electrodes to ionize said medium, at least one other electrode, a circuit coupled to said other electrode and having means to bias said other electrode to a potential greater than the potential of said medium when ionized, means to apply electromagnetic wave energy across a portion of said ionized medium adjacent said other electrode to effect a rectification of at least a portion of said wave energy through said ionized medium to produce a flow of direct current in said circuit, and means to detect said direct current, the means to apply electromagnetic wave energy including two electrodes immersed in said medium intermediate said pair of electrodes, one of said two electrodes being said other electrode.

References Cited in the file of this patent

UNITED STATES PATENTS

| | | |
|---|---|---|
| 1,506,468 | White | Aug. 26, 1924 |
| 1,629,009 | Snook | May 17, 1927 |
| 2,195,505 | Thompson | Apr. 2, 1940 |
| 2,333,119 | Packard | Nov. 2, 1943 |
| 2,538,267 | Pierce et al. | Jan. 16, 1951 |
| 2,581,305 | Skellett | Jan. 1, 1952 |